United States Patent
Qin et al.

(10) Patent No.: US 11,045,789 B1
(45) Date of Patent: Jun. 29, 2021

(54) BIOMASS INTELLIGENT FIBER-BASED AMPHOTERIC MULTIFUNCTIONAL ADSORPTIVE MATERIAL AND PREPARATION METHOD AND USE THEREOF

(71) Applicant: GUANGXI UNIVERSITY, Guangxi (CN)

(72) Inventors: Chengrong Qin, Guangxi (CN); Hui He, Guangxi (CN); Hongxiang Zhu, Guangxi (CN); Lei Wang, Guangxi (CN); Hang Zhou, Guangxi (CN); Zongyan Quan, Guangxi (CN); Zhiping Chen, Guangxi (CN)

(73) Assignee: GUANGXI UNIVERSITY, Guangxi (CN)

(*) Notice: Subject to any disclaimer, the term of this patent is extended or adjusted under 35 U.S.C. 154(b) by 0 days.

(21) Appl. No.: 16/898,448

(22) Filed: Jun. 11, 2020

(30) Foreign Application Priority Data

Apr. 14, 2020 (CN) .......................... 202010291732.6

(51) Int. Cl.
| | | |
|---|---|---|
| *B01D 53/02* | (2006.01) | |
| *B01J 20/26* | (2006.01) | |
| *B01J 20/28* | (2006.01) | |
| *B01J 20/32* | (2006.01) | |
| *C02F 1/28* | (2006.01) | |
| *C02F 101/20* | (2006.01) | |

(52) U.S. Cl.
CPC ............ *B01J 20/267* (2013.01); *B01D 53/02* (2013.01); *B01J 20/28023* (2013.01); *B01J 20/3208* (2013.01); *B01J 20/3219* (2013.01); *B01J 20/3282* (2013.01); *B01J 20/3293* (2013.01); *C02F 1/288* (2013.01); *B01D 2253/202* (2013.01); *B01D 2257/504* (2013.01); *B01D 2259/40088* (2013.01); *C02F 1/285* (2013.01); *C02F 2101/20* (2013.01)

(58) Field of Classification Search
CPC ........ B01D 53/02; B01D 53/04; B01D 53/62; B01D 53/64; B01D 2253/202; B01D 2257/504; B01D 2257/60; B01D 2258/40088; B01J 20/267; B01J 20/28023; B01J 20/3208; B01J 20/3219; B01J 20/3293; B01J 20/3282; C02F 1/288; C02F 1/285; C02F 2101/20
USPC ....... 95/139, 148; 96/108; 210/688; 502/401
See application file for complete search history.

(56) References Cited

U.S. PATENT DOCUMENTS

| | | | | |
|---|---|---|---|---|
| 7,655,070 | B1 * | 2/2010 | Dallas | B01D 39/04 95/154 |
| 8,420,567 | B1 * | 4/2013 | Naumann | A61L 15/60 502/402 |
| 2008/0251081 | A1 * | 10/2008 | Claussen | A61M 16/105 128/205.27 |
| 2012/0076711 | A1 * | 3/2012 | Gebald | B01J 20/28066 423/228 |
| 2016/0199810 | A1 * | 7/2016 | Goeppert | C07C 41/01 423/418.2 |

FOREIGN PATENT DOCUMENTS

WO WO91/19675 * 12/1991

* cited by examiner

*Primary Examiner* — Frank M Lawrence, Jr.
(74) *Attorney, Agent, or Firm* — JCIP Global Inc.

(57) ABSTRACT

The present invention discloses a biomass intelligent fiber-based amphoteric multifunctional adsorptive material and a preparation method and use thereof. The material is obtained by using a stepwise dual-temperature stimuli-responsive biomass intelligent fiber as a matrix, a crown ether-modified amphoteric hyperbranched polyamine as a functional reagent, and by using a crosslinking agent to directly cross-link and combine the stepwise dual-temperature stimuli-responsive biomass intelligent fiber with the crown ether-modified amphoteric hyperbranched polyamine in one step. The material has a stepwise dual-temperature stimuli-response, high densities of amino group (more than 12 mmol/g) and carboxyl group (5 mmol/g), and nano cavities.

20 Claims, No Drawings

BIOMASS INTELLIGENT FIBER-BASED AMPHOTERIC MULTIFUNCTIONAL ADSORPTIVE MATERIAL AND PREPARATION METHOD AND USE THEREOF

CROSS-REFERENCE TO RELATED APPLICATION

This application claims the priority benefit of China application serial no. 202010291732.6, filed on Apr. 14, 2020. The entirety of the above-mentioned patent application is hereby incorporated by reference herein and made a part of this specification.

TECHNICAL FIELD

The present invention belongs to the technical field of biomass fiber modification, and specifically relates to a biomass intelligent fiber-based amphoteric multifunctional adsorptive material and a preparation method and use thereof.

BACKGROUND

At present, the removal technology of heavy metal ions in water mainly includes chemical precipitation, flotation, reduction, ion exchange, electrodialysis, solvent extraction, biosorption, membrane separation and adsorption. The adsorption method is deemed as a promising removal method due to its advantages such as flexibility of operation and low cost of operation. However, most of the presently reported cellulose-based adsorptive materials for heavy metal ions have complicated preparation process, and the material has relatively low density of functional group that adsorbs heavy metal ions, resulting in relatively low removal rate and removal efficiency, especially showing worse removal effect when the concentration of the heavy metal ions is low, and thus it is difficult to realize simultaneous removal of anionic and cationic heavy metal ions.

At present, the $CO_2$ capturing method mainly includes absorption method, membrane separation method, adsorption method and deep condensation method. Particularly the adsorption method is to selectively capture and separate $CO_2$ based on surface active sites of a porous material, having advantages such as flexibility of operation and low cost of operation. However, the conventional $CO_2$ adsorptive material is facing issues that it is difficult to have both high $CO_2$ adsorption capacity and low regeneration temperature.

SUMMARY

The objective of the present invention is to provide a biomass intelligent fiber-based amphoteric multifunctional adsorptive material and a preparation method thereof. The material has a stepwise dual-temperature stimuli-response, high densities of amino group and carboxyl group, and nano cavities, enabling the material to have properties of both high $CO_2$ adsorption capacity and low regeneration temperature, and realizing simultaneous, complete and fast removal of low concentration of anionic and cationic heavy metal ions.

The above-mentioned objective of the present invention is achieved by the following technical solution.

A biomass intelligent fiber-based amphoteric multifunctional adsorptive material is obtained by using a stepwise dual-temperature stimuli-responsive biomass intelligent fiber as a matrix, a crown ether-modified amphoteric hyperbranched polyamine as a functional reagent, and using a crosslinking agent to directly crosslink and combine the stepwise dual-temperature stimuli-responsive biomass intelligent fiber with the crown ether-modified amphoteric hyperbranched polyamine in one step;

wherein a stepwise dual-temperature stimuli-response of the stepwise dual-temperature stimuli-responsive biomass intelligent fiber is a stimuli-response with two temperature stages, where lower critical solution temperatures thereof respectively range from 30-37° C. and from 40-50° C., obtained by chemically grafting a stepwise dual-temperature stimuli-responsive polyethyleneimine onto a biomass fibrous raw material; the stepwise dual-temperature stimuli-responsive polyethyleneimine is obtained by evenly mixing in proportion after a Michael addition reaction of N-isopropyl acrylamide with polyethyleneimine and a Michael addition reaction of dimethylamino ethyl methacrylate with polyethyleneimine;

the crown ether-modified amphoteric hyperbranched polyamine is obtained by modifying a hyperbranched polyamine with triethylenetetraminepentaacetic acid and 4'-aminobenzo-18-crown-6, wherein carboxyl groups of the triethylenetetraminepentaacetic acid are subjected to amidation reactions respectively with an amino group of the hyperbranched polyamine and an amino group of the 4'-aminobenzo-18-crown-6; and the hyperbranched polyamine is obtained by a Michael addition reaction and a self-condensation reaction of an aminating reagent with methyl acrylate.

Preferably, epichlorohydrin is used as the crosslinking agent. One or a mixture of more of bagasse pulp fiber, *Eucalyptus* pulp fiber and bamboo pulp fiber is used as the biomass fibrous raw material.

A preparation method for the biomass intelligent fiber-based amphoteric multifunctional adsorptive material includes the following preparation steps:

S1, preparation of a carboxylated biomass fiber: oxidizing a hydroxyl group at a C6 position of a cellulose structural unit of a biomass fibrous raw material into a carboxyl group by using a TEMPO(2,2,6,6-tetramethylpiperidine-1-oxyl) reagent, regulating and controlling an oxidation degree by controlling reaction conditions to prepare the carboxylated biomass fiber;

S2, preparation of a stepwise dual-temperature stimuli-responsive polyethyleneimine: respectively subjecting N-isopropyl acrylamide and dimethylamino ethyl methacrylate to Michael addition reactions with polyethyleneimine, then evenly mixing in proportion to obtain a modified polyethyleneimine having stepwise dual-temperature stimuli-response;

S3, preparation of a stepwise dual-temperature stimuli-responsive biomass intelligent fiber: subjecting the carboxylated biomass fiber and the stepwise dual-temperature stimuli-responsive polyethyleneimine to an amidation reaction at high temperature;

S4, preparation of a crown ether-modified amphoteric hyperbranched polyamine: subjecting an aminating reagent and methyl acrylate to a Michael addition reaction to generate a hyperbranched polyamine precursor, where hyperbranched polyamine is generated by a self-condensation reaction of the hyperbranched polyamine precursor; the crown ether-modified amphoteric hyperbranched polyamine is obtained by modifying the hyperbranched polyamine with triethylenetetraminepentaacetic acid and 4'-aminobenzo-18-crown-6, where carboxyl groups of the triethylenetetraminepentaacetic acid are subjected to amidation reactions respectively with an amino group of the hyperbranched polyamine and an amino group of the 4'-aminobenzo-18-crown-6; and S5, one-step crosslink by using a crosslinking agent: evenly mixing the stepwise dual-temperature stimuli-responsive biomass intelligent fiber prepared in the step S3 and the crown ether-modified amphoteric hyperbranched polyamine prepared in the step S4 in an alkaline solution, adding a crosslinking agent epichlorohydrin under stirring, where a mixed solution is directly crosslinked into solid particles to obtain the biomass intelligent fiber-based amphoteric multifunctional adsorptive material.

Further, specific operation of the step S1 is as follows: adding a sodium phosphate buffer solution to the biomass fibrous raw material, evenly mixing at 55-65° C., then adding TEMPO, adding a sodium hypochlorite solution, then adding sodium chlorite, oxidizing for 15-17 hours, adding ethanol for quenching, washing, drying to obtain the carboxylated biomass fiber; a mass ratio of the biomass fibrous raw material to TEMPO is 200:2.5 to 200:2.8.

Further, specific operation of the step S2 is as follows: at 55-65° C. under magnetic stirring, dropwise adding a polyethyleneimine aqueous solution with a concentration of 0.15-0.25 g/mL to a N-isopropyl acrylamide aqueous solution with a concentration of 0.03-0.09 g/mL according to a volume ratio of 1:3, and after reacting for 22-26 hours, quenching with liquid nitrogen, dialyzing an obtained solution with a MWCO500D dialysis bag in water for 22-26 hours, then freeze-drying to obtain the polyethyleneimine modified by N-isopropyl acrylamide, regulating and controlling a lower critical solution temperature of a lower temperature stage within the range of 30-37° C. by controlling an addition amount of N-isopropyl acrylamide; at 55-65° C. under magnetic stirring, dropwise adding a polyethyleneimine aqueous solution with a concentration of 0.06-0.07 g/mL to a dimethylamino ethyl methacrylate aqueous solution with a concentration of 0.05-0.10 g/mL according to a volume ratio of 1:1, and after reacting for 22-26 hours, quenching with liquid nitrogen, dialyzing an obtained solution with the MWCO500D dialysis bag in water for 22-26 hours, then freeze-drying to obtain the polyethyleneimine modified by dimethylamino ethyl methacrylate, regulating and controlling a lower critical solution temperature of a higher temperature stage within the range of 40-50° C. by controlling an addition amount of dimethylamino ethyl methacrylate; mixing the polyethyleneimine modified by dimethylamino ethyl methacrylate and the polyethyleneimine modified by N-isopropyl acrylamide according to a mass-equivalent ratio to obtain the stepwise dual-temperature stimuli-responsive polyethyleneimine.

Further, specific operation of the step S3 is as follows: dispersing equivalent mass of the stepwise dual-temperature stimuli-responsive polyethyleneimine and the carboxylated biomass fiber into water, and after ultrasonic treatment, reacting at 100° C. for 8-10 hours, then centrifuging until a supernatant shows neutral, freeze-drying a precipitate to obtain the stepwise dual-temperature stimuli-responsive biomass intelligent fiber.

Further, specific operation of the step S4 is as follows: dissolving the aminating reagent in absolute methanol according to a volume ratio of 9:5 to 10:5, dissolving methyl acrylate in absolute methanol according to a volume ratio of 2:5 to 3:5, charging nitrogen into the aminating reagent solution, dropwise adding the methyl acrylate solution to the aminating reagent solution according to a volume ratio of 1:1 at 0° C. under stirring, then reacting at normal temperature for 18-24 hours, and obtaining the hyperbranched polyamine precursor, evaporating the hyperbranched polyamine precursor at 60-70° C. for 0.5-1.5 hours, then increasing the temperature to 100° C. and 140° C. successively and reacting respectively for 2-3 hours, and obtaining the hyperbranched polyamine; the aminating reagent is diethylenetriamine, triethylenetetramine or tetraethylenepentamine; mixing the hyperbranched polyamine, triethylenetetraminepentaacetic acid, 4'-aminobenzo-18-crown-6 and water evenly under stirring according to a mass ratio of 4:2:(1 to 3):(1 to 3), reacting at 100° C. for 5-8 hours, then dialyzing with a dialysis bag for 22-26 hours to obtain the crown ether-modified amphoteric hyperbranched polyamine.

Further, specific operation of the step S5 is as follows: mixing the stepwise dual-temperature stimuli-responsive biomass intelligent fiber and the crown ether-modified amphoteric hyperbranched polyamine according to a mass ratio of 1:1 to 1:10, then dispersing in a 1-4 wt % NaOH aqueous solution, adding epichlorohydrin under stirring at a speed of 100-800 r/min, conducting a crosslinking reaction for 10-60 minutes to obtain the biomass intelligent fiber-based amphoteric multifunctional adsorptive material; a mass ratio of the stepwise dual-temperature stimuli-responsive biomass intelligent fiber to epichlorohydrin is 1:0.2 to 1:1; and a mass/volume ratio of the stepwise dual-temperature stimuli-responsive biomass intelligent fiber to the NaOH aqueous solution is 1 g:100 mL to 1 g:500 mL. The biomass intelligent fiber-based amphoteric multifunctional adsorptive material can be used in heavy metal adsorption, $CO_2$ capturing, and marsh gas purification. When the material can be used in heavy metal adsorption, a low concentration of anionic and cationic heavy metal ions can be completely removed at the same time. When the material can be used in $CO_2$ capturing, a $CO_2$ adsorption capacity is greater than 6 mmol/g, and after saturated adsorption of $CO_2$, a regeneration temperature thereof is lower than 60° C.

The present invention has the following beneficial effects.

(1) The biomass intelligent fiber-based amphoteric multifunctional adsorptive material prepared by the present invention has a stepwise dual-temperature stimuli-response. The stepwise dual-temperature stimuli-response of the material decreases a regeneration temperature of the material after adsorbing $CO_2$ (a regeneration rate is greater than 95% when regenerating at a low temperature of lower than 60° C.). The material has high density of amino group (greater than 12 mmol/g) and nano cavities, which accelerates the adsorption of $CO_2$ (an adsorption capacity is greater than 6 mmol/g), and enables the material to have properties of both high $CO_2$ adsorption capacity and low regeneration temperature, overcoming the issue that it is difficult for the conventional $CO_2$ adsorptive material to have both high $CO_2$ adsorption capacity and low regeneration temperature.

(2) The biomass intelligent fiber-based amphoteric multifunctional adsorptive material prepared by the present invention has high densities of amino group (greater than 12 mmol/g) and carboxyl group (greater than 5 mmol/g), accelerating the simultaneous and complete removal of low concentration (1 g/mL) of anionic and cationic heavy metal ions (Cr(VI), Cd(II), Cu(II), Zn(II) and Pb(II)). After adsorption, the content of heavy metal ions in the solution meets the drinking water standard (US Environmental Protection Agency, EPA). The material has hyperbranched nano cavities and nano cavities having oxygen-containing adsorptive sites of crown ether, which accelerate the adsorption rate of heavy metal ions, and remove the heavy metal ions from the solution to meet the drinking water standard (US EPA) within 10 minutes.

(3) The present invention adopts a one-step fast crosslinking method, and prepares a biomass intelligent fiber-based amphoteric multifunctional adsorptive material by crosslinking the hydroxyl group of the stepwise dual-temperature stimuli-responsive biomass intelligent fiber and the amino group of the crown ether-modified amphoteric hyperbranched polyamine through epichlorohydrin. The crosslinking method can regulate and control the content of functional group of the material by effectively utilizing the limited hydroxyl group sites and amino group sites and by controlling the ratio of reactants, so as to provide technical guarantee for controllable preparation of the material.

(4) The stepwise dual-temperature stimuli-response is established on the material by the present invention. During $CO_2$ desorption, the temperature increases gradually, and the dual-temperature stimuli-response is triggered stepwise, so that molecular chain of the material shrinks twice, and a stepwise transition of hydrophilic state to hydrophobic, and more hydrophobic state takes place, accelerating $CO_2$ to be desorbed gradually from the material after saturated adsorption, and realizing complete desorption and regeneration. The desorption temperature of the present invention is lower than 60° C.

(5) During desorption, molecular chain of the material that is subjected to saturated adsorption of $CO_2$ shrinks due to its temperature-sensitive effect, and desorption of gas is accelerated. By using the stepwise dual-temperature stimulus, molecular chain of the material of the present invention shrinks gradually which is conducive to release of $CO_2$ gas step by step.

DETAILED DESCRIPTION

Embodiment 1

S1. Preparation of a carboxylated biomass fiber: 2 g of bagasse pulp fibers were added with 180 mL of a sodium phosphate buffer solution (0.05 M, pH=6.8), and a suspension liquid was stirred at a speed of 500 rpm in a sealed flask at 55° C., then 0.025 g of TEMPO, subsequently 1.183 mL of a 1.69 M sodium hypochlorite solution, and finally 2.1307 g of sodium chlorite were added. After 17 hours of oxidation, 5 mL of ethanol was added for quenching, and the carboxylated biomass fiber was obtained after washing and drying.

S2. Preparation of a stepwise dual-temperature stimuli-responsive polyethyleneimine: 1.5 g of polyethyleneimine was dissolved in 10 mL of water, and 0.9 g of N-isopropyl acrylamide was dissolved in 30 mL of water. At 55° C. under magnetic stirring, 10 mL of the polyethyleneimine aqueous solution was dropwise added to 30 mL of the N-isopropyl acrylamide aqueous solution, and after 22 hours of reaction, quenching was carried out by using liquid nitrogen. All solutions obtained were dialyzed with the MWCO500D dialysis bag in water for 22 hours, and then freeze-dried to obtain the polyethyleneimine modified by N-isopropyl acrylamide. Lower critical solution temperature (LCST) of a lower temperature stage was regulated and controlled within the range of 30-37° C. by controlling an addition amount of N-isopropyl acrylamide. 1.8 g of polyethyleneimine was dissolved in 30 mL of water, and 1.5 g of dimethylamino ethyl methacrylate was dissolved in 30 mL of water. At 55° C. under magnetic stirring, 30 mL of the polyethyleneimine aqueous solution was dropwise added to 30 mL of the dimethylamino ethyl methacrylate aqueous solution, and after 22 hours of reaction, quenching was carried out by using liquid nitrogen. All solutions obtained were dialyzed with the MWCO500D dialysis bag in water for 22 hours, and then freeze-dried to obtain the polyethyleneimine modified by dimethylamino ethyl methacrylate. Lower critical solution temperature (LCST) of a higher temperature stage was regulated and controlled within the range of 40-50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of a stepwise dual-temperature stimuli-responsive biomass intelligent fiber: 1.0 g of the stepwise dual-temperature stimuli-responsive polyethyleneimine and 1.0 g of the carboxylated biomass fiber were dispersed into 25 mL of water, and after 30 minutes of ultrasonic treatment (300 W), a reaction was carried out at 100° C. for 8 hours. Then, centrifugation (4800 r/min, 10 minutes) was carried out until a supernatant showed neutral. A precipitate was freeze-dried, and the stepwise dual-temperature stimuli-responsive biomass intelligent fiber was obtained.

S4. Preparation of a crown ether-modified amphoteric hyperbranched polyamine: diethylenetriamine was dissolved in absolute methanol according to a volume ratio of 9:5, and methyl acrylate was dissolved in absolute methanol according to a volume ratio of 2:5. Nitrogen was charged into the diethylenetriamine solution, and the methyl acrylate solution was dropwise added to the diethylenetriamine solution according to a volume ratio of 1:1 at 0° C. under stirring. Then, a reaction was carried out at normal temperature for 18 hours, and a hyperbranched polyamine precursor was obtained. The hyperbranched polyamine precursor was evaporated at 70° C. for 0.5 hour, followed by increasing the temperature to 100° C. and 140° C. successively and reacting respectively for 2 hours, and a hyperbranched polyamine was obtained. The hyperbranched polyamine, triethylenetetraminepentaacetic acid, 4'-aminobenzo-18-crown-6 and water were evenly mixed under stirring according to a mass ratio of 4:2:1:1, subjected to a reaction at 100° C. for 5 hours, and then dialyzed with a dialysis bag for 22 hours to obtain the crown ether-modified amphoteric hyperbranched polyamine.

S5. One-step crosslink by using a crosslinking agent: the stepwise dual-temperature stimuli-responsive biomass intelligent fiber and the crown ether-modified amphoteric hyperbranched polyamine were mixed according to a mass ratio of 1:1, and dispersed in a 4 wt % NaOH aqueous solution (a mass/volume ratio of the stepwise dual-temperature stimuli-responsive biomass intelligent fiber to the NaOH aqueous solution is 1 g: 100 mL). Epichlorohydrin (a mass ratio of the stepwise dual-temperature stimuli-responsive biomass intelligent fiber to epichlorohydrin is 1:0.2) was added under stirring at a speed of 100 r/min and subjected to a cross-linking reaction for 10 minutes, and the biomass intelligent fiber-based amphoteric multifunctional adsorptive material was obtained.

Embodiment 2

S1. Preparation of a carboxylated biomass fiber: 2 g of bagasse pulp fibers were added with 180 mL of a sodium phosphate buffer solution (0.05 M, pH=6.8), and a suspension liquid was stirred at a speed of 500 rpm in a sealed flask at 60° C., then 0.026 g of TEMPO, subsequently 1.183 mL of a 1.69 M sodium hypochlorite solution, and finally 2.1307 g of sodium chlorite were added. After 16 hours of oxidation, 5 mL of ethanol was added for quenching, and the carboxylated biomass fiber was obtained after washing and drying.

S2. Preparation of a stepwise dual-temperature stimuli-responsive polyethyleneimine: 2.0 g of polyethyleneimine was dissolved in 10 mL of water, and 1.8 g of N-isopropyl acrylamide was dissolved in 30 mL of water. At 60° C. under magnetic stirring, 10 mL of the polyethyleneimine aqueous solution was dropwise added to 30 mL of the N-isopropyl acrylamide aqueous solution, and after 24 hours of reaction, quenching was carried out by using liquid nitrogen. All solutions obtained were dialyzed with the MWCO500D dialysis bag in water for 24 hours, and then freeze-dried to obtain the polyethyleneimine modified by N-isopropyl acrylamide. The lower critical solution temperature (LCST) of the lower temperature stage was regulated and controlled within the range of 30-37° C. by controlling an addition amount of N-isopropyl acrylamide. 2.0 g of polyethyleneimine was dissolved in 30 mL of water, and 2.4 g of dimethylamino ethyl methacrylate was dissolved in 30 mL of water. At 60° C. under magnetic stirring, 30 mL of the polyethyleneimine aqueous solution was dropwise added to 30 mL of the dimethylamino ethyl methacrylate aqueous solution, and after 24 hours of reaction, quenching was carried out by using liquid nitrogen. All solutions obtained were dialyzed with the MWCO500D dialysis bag in water for 24 hours, and then freeze-dried to obtain the polyethyleneimine modified by dimethylamino ethyl methacrylate. The lower critical solution temperature (LCST) of the higher temperature stage was regulated and controlled within the range of 40-50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of a stepwise dual-temperature stimuli-responsive biomass intelligent fiber: 1.0 g of the stepwise dual-temperature stimuli-responsive polyethyleneimine and 1.0 g of the carboxylated biomass fiber were dispersed into 25 mL of water, and after 30 minutes of ultrasonic treatment (300 W), a reaction was carried out at 100° C. for 9 hours. Then, centrifugation (4800 r/min, 10 minutes) was carried out until a supernatant showed neutral. A precipitate was freeze-dried, and the stepwise dual-temperature stimuli-responsive biomass intelligent fiber was obtained.

S4. Preparation of a crown ether-modified amphoteric hyperbranched polyamine: triethylenetetramine was dissolved in absolute methanol according to a volume ratio of 9.6:5, and methyl acrylate was dissolved in absolute methanol according to a volume ratio of 2.7:5. Nitrogen was charged into the triethylenetetramine solution, and the methyl acrylate solution was dropwise added to the triethylenetetramine solution according to a volume ratio of 1:1 at 0° C. under stirring. Then, a reaction was carried out at normal temperature for 22 hours, and a hyperbranched polyamine precursor was obtained. The hyperbranched polyamine precursor was evaporated at 65° C. for 1.0 hour, followed by increasing the temperature to 100° C. and 140° C. successively and reacting respectively for 2.5 hours, and a hyperbranched polyamine was obtained. The hyperbranched polyamine, triethylenetetraminepentaacetic acid, 4'-aminobenzo-18-crown-6 and water were evenly mixed under stirring according to a mass ratio of 4:2:2:2, subjected to a reaction at 100° C. for 6 hours, and then dialyzed with a dialysis bag for 24 hours to obtain the crown ether-modified amphoteric hyperbranched polyamine.

S5. One-step crosslink by using a crosslinking agent: the stepwise dual-temperature stimuli-responsive biomass intelligent fiber and the crown ether-modified amphoteric hyperbranched polyamine were mixed according to a mass ratio of 1:6, and dispersed in a 3 wt % NaOH aqueous solution (a mass/volume ratio of the stepwise dual-temperature stimuli-responsive biomass intelligent fiber to the NaOH aqueous solution is 1 g: 300 mL). Epichlorohydrin (a mass ratio of the stepwise dual-temperature stimuli-responsive biomass intelligent fiber to epichlorohydrin is 1:0.7) was added under stirring at a speed of 500 r/min and subjected to a crosslinking reaction for 40 minutes, and the biomass intelligent fiber-based amphoteric multifunctional adsorptive material was obtained.

Embodiment 3

S1. Preparation of a carboxylated biomass fiber: 2 g of bagasse pulp fibers were added with 180 mL of a sodium phosphate buffer solution (0.05 M, pH=6.8), and a suspension liquid was stirred at a speed of 500 rpm in a sealed flask at 65° C., then 0.028 g of TEMPO, subsequently 1.183 mL of a 1.69 M sodium hypochlorite solution, and finally 2.1307 g of sodium chlorite were added. After 15 hours of oxidation, 5 mL of ethanol was added for quenching, and the carboxylated biomass fiber was obtained after washing and drying.

S2. Preparation of a stepwise dual-temperature stimuli-responsive polyethyleneimine: 2.5 g of polyethyleneimine was dissolved in 10 mL of water, and 2.7 g of N-isopropyl acrylamide was dissolved in 30 mL of water. At 65° C. under magnetic stirring, 10 mL of the polyethyleneimine aqueous solution was dropwise added to 30 mL of the N-isopropyl acrylamide aqueous solution, and after 26 hours of reaction, quenching was carried out by using liquid nitrogen. All solutions obtained were dialyzed with the MWCO500D dialysis bag in water for 26 hours, and then freeze-dried to obtain the polyethyleneimine modified by N-isopropyl acrylamide. The lower critical solution temperature (LCST) of the lower temperature stage was regulated and controlled within the range of 30-37° C. by controlling an addition amount of N-isopropyl acrylamide. 2.1 g of polyethyleneimine was dissolved in 30 mL of water, and 3.0 g of dimethylamino ethyl methacrylate was dissolved in 30 mL of water. At 65° C. under magnetic stirring, 30 mL of the polyethyleneimine aqueous solution was dropwise added to 30 mL of the dimethylamino ethyl methacrylate aqueous solution, and after 26 hours of reaction, quenching was carried out by using liquid nitrogen. All solutions obtained were dialyzed with the MWCO500D dialysis bag in water for 26 hours, and then freeze-dried to obtain the polyethyleneimine modified by dimethylamino ethyl methacrylate. The lower critical solution temperature (LCST) of the higher temperature stage was regulated and controlled within the range of 40-50° C. by controlling an addition amount of dimethylamino ethyl methacrylate. The polyethyleneimine modified by dimethylamino ethyl methacrylate and the polyethyleneimine modified by N-isopropyl acrylamide were mixed according to a mass-equivalent ratio, and the stepwise dual-temperature stimuli-responsive polyethyleneimine was obtained.

S3. Preparation of a stepwise dual-temperature stimuli-responsive biomass intelligent fiber: 1.0 g of the stepwise dual-temperature stimuli-responsive polyethyleneimine and 1.0 g of the carboxylated biomass fiber were dispersed into 25 mL of water, and after 30 minutes of ultrasonic treatment (300 W), a reaction was carried out at 100° C. for 10 hours. Then, centrifugation (4800 r/min, 10 minutes) was carried out until a supernatant showed neutral. A precipitate was freeze-dried, and the stepwise dual-temperature stimuli-responsive biomass intelligent fiber was obtained.

S4. Preparation of a crown ether-modified amphoteric hyperbranched polyamine: tetraethylenepentamine was dissolved in absolute methanol according to a volume ratio of 10:5, and methyl acrylate was dissolved in absolute methanol according to a volume ratio of 3:5. Nitrogen was charged into the tetraethylenepentamine solution, and the methyl acrylate solution was dropwise added to the tetraethylenepentamine solution according to a volume ratio of 1:1 at 0° C. under stirring. Then, a reaction was carried out at normal temperature for 24 hours, and a hyperbranched polyamine precursor was obtained. The hyperbranched polyamine precursor was evaporated at 60° C. for 1.5 hours, followed by increasing the temperature to 100° C. and 140° C. successively and reacting respectively for 3 hours, and a hyperbranched polyamine was obtained. The hyperbranched polyamine, triethylenetetraminepentaacetic acid, 4'-aminobenzo-18-crown-6 and water were evenly mixed under stirring according to a mass ratio of 4:2:3:3, subjected to a reaction at 100° C. for 8 hours, and then dialyzed with a dialysis bag for 26 hours to obtain the crown ether-modified amphoteric hyperbranched polyamine.

S5. One-step crosslink by using a crosslinking agent: the stepwise dual-temperature stimuli-responsive biomass intelligent fiber and the crown ether-modified amphoteric hyperbranched polyamine were mixed according to a mass ratio of 1:10, and dispersed in a 1 wt % NaOH aqueous solution (a mass/volume ratio of the stepwise dual-temperature stimuli-responsive biomass intelligent fiber to the NaOH aqueous solution is 1 g:500 mL). Epichlorohydrin (a mass ratio of the stepwise dual-temperature stimuli-responsive biomass intelligent fiber to epichlorohydrin is 1:1) was added under stirring at a speed of 800 r/min and subjected to a crosslinking reaction for 60 minutes, and the biomass intelligent fiber-based amphoteric multifunctional adsorptive material was obtained.

Properties characterization of the biomass intelligent fiber-based amphoteric multifunctional adsorptive materials prepared by Embodiments 1, 2 and 3

1. The biomass intelligent fiber-based amphoteric multifunctional adsorptive materials prepared by Embodiments 1, 2 and 3 were subjected to a dual-temperature stimuli-responsive property test. The test results all show good dual-temperature stimuli-responsive property. The materials show hydrophilic property under the condition of 25° C. (a water contact angle is less than 30°, and the water contact angles of Embodiments 1, 2 and 3 are 20°, 18° and 16° respectively). When the temperature increases to 30-37° C., the materials show hydrophobic property (a water contact angle is more than 95°, and the water contact angles of Embodiments 1, 2 and 3 are 98°, 103° and 106° respectively). When the temperature increases to 40-50° C., the materials show further increased hydrophobic property (a water contact angle is more than 118°, and the water contact angles of Embodiments 1, 2 and 3 were increased to 119°, 121° and 122° respectively).

2. The biomass intelligent fiber-based amphoteric multifunctional adsorptive materials prepared by Embodiments 1, 2 and 3 were subjected to an adsorption property test to heavy metals in water. The test results show that all the materials can realize simultaneous, complete and fast removal of low concentration (1 g/mL) of anionic heavy metal ions ($Cr(VI)$) and cationic heavy metal ions ($Cd(II)$, $Cu(II)$, $Zn(II)$ and $Pb(II)$), and remove the heavy metal ions from the solution to meet the drinking water standard (US EPA) within 10 minutes.

3. The biomass intelligent fiber-based amphoteric multifunctional adsorptive materials prepared by Embodiments 1, 2 and 3 were subjected to a gas adsorption/desorption property test to $CO_2$. All the test results show excellent gas adsorption/desorption property to $CO_2$, and that a $CO_2$ adsorption capacity in wet state is greater than 6 mmol/g (the $CO_2$ adsorption capacities of Embodiments 1, 2 and 3 are 6.21 mmol/g, 6.28 mmol/g and 6.31 mmol/g respectively) and low-temperature regeneration (a regeneration temperature is lower than 60° C.) can be achieved after adsorption with a regeneration rate of more than 95%, indicating that the materials have both high $CO_2$ adsorption capacity and low regeneration temperature. The material can be used in adsorption of gaseous $CO_2$ in the marsh gas and marsh gas purification, where a methane content in the purified marsh gas is greater than 98%.

What is claimed is:

1. A biomass intelligent fiber-based amphoteric multifunctional adsorptive material, characterized in that, the adsorptive material is obtained by using a stepwise dual-temperature stimuli-responsive biomass intelligent fiber as a matrix, a crown ether-modified amphoteric hyperbranched polyamine as a functional reagent, and using a crosslinking agent to directly crosslink and combine the stepwise dual-temperature stimuli-responsive biomass intelligent fiber with the crown ether-modified amphoteric hyperbranched polyamine in one step;

wherein a stepwise dual-temperature stimuli-response of the stepwise dual-temperature stimuli-responsive biomass intelligent fiber is a stimuli-response with two temperature stages, where lower critical solution temperatures thereof respectively range from 30-37° C. and from 40-50° C., obtained by chemically grafting a stepwise dual-temperature stimuli-responsive polyethyleneimine onto a biomass fibrous raw material; the stepwise dual-temperature stimuli-responsive polyethyleneimine is obtained by evenly mixing in proportion after a Michael addition reaction of N-isopropyl acrylamide with polyethyleneimine and a Michael addition reaction of dimethylamino ethyl methacrylate with polyethyleneimine;

the crown ether-modified amphoteric hyperbranched polyamine is obtained by modifying a hyperbranched polyamine with triethylenetetraminepentaacetic acid and 4'-aminobenzo-18-crown-6, wherein carboxyl groups of the triethylenetetraminepentaacetic acid are subjected to amidation reactions respectively with an amino group of the hyperbranched polyamine and an amino group of the 4'-aminobenzo-18-crown-6; and the hyperbranched polyamine is obtained by a Michael addition reaction and a self-condensation reaction of an aminating reagent with methyl acrylate.

2. The biomass intelligent fiber-based amphoteric multifunctional adsorptive material according to claim 1, wherein the crosslinking agent is epichlorohydrin.

3. The biomass intelligent fiber-based amphoteric multifunctional adsorptive material according to claim 1 wherein the biomass fibrous raw material is one or a mixture of more of bagasse pulp fiber, *Eucalyptus* pulp fiber and bamboo pulp fiber.

4. A preparation method for a biomass intelligent fiber-based amphoteric multifunctional adsorptive material, characterized in that, the preparation method comprises the following preparation steps:

- S1, preparation of a carboxylated biomass fiber: oxidizing a hydroxyl group at a C6 position of a cellulose structural unit of a biomass fibrous raw material into a carboxyl group by using a TEMPO reagent, and regulating and controlling an oxidation degree by controlling the reaction conditions to prepare the carboxylated biomass fiber;
- S2, preparation of a stepwise dual-temperature stimuli-responsive polyethyleneimine: respectively subjecting N-isopropyl acrylamide and dimethylamino ethyl methacrylate to Michael addition reactions with polyethyleneimine, then evenly mixing in proportion to obtain a modified polyethyleneimine having stepwise dual-temperature stimuli-response;
- S3, preparation of a stepwise dual-temperature stimuli-responsive biomass intelligent fiber: subjecting the carboxylated biomass fiber and the stepwise dual-temperature stimuli-responsive polyethyleneimine to an amidation reaction at high temperature;
- S4, preparation of a crown ether-modified amphoteric hyperbranched polyamine: subjecting an aminating reagent and methyl acrylate to a Michael addition reaction to generate a hyperbranched polyamine precursor, where hyperbranched polyamine is generated by a self-condensation reaction of the hyperbranched polyamine precursor; the crown ether-modified amphoteric hyperbranched polyamine is obtained by modifying the hyperbranched polyamine with triethylenetetraminepentaacetic acid and 4'-aminobenzo-18-crown-6, where carboxyl groups of the triethylenetetraminepentaacetic acid are subjected to amidation reactions respectively with an amino group of the hyperbranched polyamine and an amino group of the 4'-aminobenzo-18-crown-6; and
- S5, one-step crosslink by using a crosslinking agent: evenly mixing the stepwise dual-temperature stimuli-responsive biomass intelligent fiber prepared in the step S3 and the crown ether-modified amphoteric hyperbranched polyamine prepared in the step S4 in an alkaline solution, adding a crosslinking agent epichlorohydrin under stirring, where a mixed solution is directly crosslinked into solid particles to obtain the biomass intelligent fiber-based amphoteric multifunctional adsorptive material.

5. The preparation method according to claim 4, wherein specific operation of the step S1 is as follows: adding a sodium phosphate buffer solution to the biomass fibrous raw material, evenly mixing at 55-65° C., then adding TEMPO, adding a sodium hypochlorite solution, then adding sodium chlorite, oxidizing for 15-17 hours, adding ethanol for quenching, washing, drying to obtain the carboxylated biomass fiber; and a mass ratio of the biomass fibrous raw material to TEMPO is 200:2.5 to 200:2.8.

6. The preparation method according to claim 4, wherein specific operation of the step S2 is as follows: at 55-65° C. under magnetic stirring, dropwise adding a polyethyleneimine aqueous solution with a concentration of 0.15-0.25 g/mL to a N-isopropyl acrylamide aqueous solution a concentration of 0.03-0.09 g/mL according to a volume ratio of 1:3, and after reacting for 22-26 hours, quenching with liquid nitrogen, dialyzing an obtained solution with a MWCO500D dialysis bag in water for 22-26 hours, then freeze-drying to obtain the polyethyleneimine modified by N-isopropyl acrylamide, regulating and controlling a lower critical solution temperature of a lower temperature stage within the range of 30-37° C. by controlling an addition amount of N-isopropyl acrylamide; at 55-65° C. under magnetic stirring, dropwise adding a polyethyleneimine aqueous solution with a concentration of 0.06-0.07 g/mL to a dimethylamino ethyl methacrylate aqueous solution with a concentration of 0.05-0.10 g/mL according to a volume ratio of 1:1, and after reacting for 22-26 hours, quenching with liquid nitrogen, dialyzing an obtained solution with the MWCO500D dialysis bag in water for 22-26 hours, then freeze-drying to obtain the polyethyleneimine modified by dimethylamino ethyl methacrylate, regulating and controlling a lower critical solution temperature of a higher temperature stage within the range of 40-50° C. by controlling an addition amount of dimethylamino ethyl methacrylate; mixing the polyethyleneimine modified by dimethylamino ethyl methacrylate and the polyethyleneimine modified by N-isopropyl acrylamide according to a mass-equivalent ratio to obtain the stepwise dual-temperature stimuli-responsive polyethyleneimine.

7. The preparation method according to claim 4, wherein specific operation of the step S3 is as follows: dispersing equivalent mass of the stepwise dual-temperature stimuli-responsive polyethyleneimine and the carboxylated biomass fiber into water, and after ultrasonic treatment, reacting at 100° C. for 8-10 hours, then centrifuging until a supernatant shows neutral, freeze-drying a precipitate to obtain the stepwise dual-temperature stimuli-responsive biomass intelligent fiber.

8. The preparation method according to claim 4, wherein specific operation of the step S4 is as follows: dissolving the aminating reagent in absolute methanol according to a volume ratio of 9:5 to 10:5, dissolving methyl acrylate in absolute methanol according to a volume ratio of 2:5 to 3:5, charging nitrogen into the aminating reagent solution, dropwise adding the methyl acrylate solution to the aminating reagent solution according to a volume ratio of 1:1 at 0° C. under stirring, then reacting at normal temperature for 18-24 hours, and obtaining the hyperbranched polyamine precursor, evaporating the hyperbranched polyamine precursor at 60-70° C. for 0.5-1.5 hours, then increasing the temperature to 100° C. and 140° C. successively and reacting respectively for 2-3 hours, and obtaining the hyperbranched polyamine; the aminating reagent is diethylenetriamine, triethylenetetramine or tetraethylenepentamine; mixing the hyperbranched polyamine, triethylenetetraminepentaacetic acid, 4'-aminobenzo-18-crown-6 and water evenly under stirring according to a mass ratio of 4:2:(1 to 3):(1 to 3), reacting at 100° C. for 5-8 hours, then dialyzing with a dialysis bag for 22-26 hours to obtain the crown ether-modified amphoteric hyperbranched polyamine.

9. The preparation method according to claim 4, wherein specific operation of the step S5 is as follows: mixing the stepwise dual-temperature stimuli-responsive biomass intelligent fiber and the crown ether-modified amphoteric hyperbranched polyamine according to a mass ratio of 1:1 to 1:10, then dispersing in a 1-4 wt % NaOH aqueous solution, adding epichlorohydrin under stirring at a speed of 100-800 r/min, conducting a crosslinking reaction for 10-60 minutes to obtain the biomass intelligent fiber-based amphoteric multifunctional adsorptive material; a mass ratio of the stepwise dual-temperature stimuli-responsive biomass intelligent fiber to epichlorohydrin is 1:0.2 to 1:1; and a mass/volume ratio of the stepwise dual-temperature stimuli-responsive biomass intelligent fiber to the NaOH aqueous solution is 1 g:100 mL to 1 g:500 mL.

10. Use of the biomass intelligent fiber-based amphoteric multifunctional adsorptive material according to claim 1 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

11. Use of the biomass intelligent fiber-based amphoteric multifunctional adsorptive material according to claim 2 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

12. Use of the biomass intelligent fiber-based amphoteric multifunctional adsorptive material according to claim 3 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

13. Use of the biomass intelligent fiber-based amphoteric multifunctional adsorptive material prepared by the preparation method according to claim 4 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

14. Use of the biomass intelligent fiber-based amphoteric multifunctional adsorptive material prepared by the preparation method according to claim 5 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

15. Use of the biomass intelligent fiber-based amphoteric multifunctional adsorptive material prepared by the preparation method according to claim 6 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

16. Use of the biomass intelligent fiber-based amphoteric multifunctional adsorptive material prepared by the preparation method according to claim 7 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

17. Use of the biomass intelligent fiber-based amphoteric multifunctional adsorptive material prepared by the preparation method according to claim 8 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

18. Use of the biomass intelligent fiber-based amphoteric multifunctional adsorptive material prepared by the preparation method according to claim 9 in heavy metal adsorption, or $CO_2$ capturing; when the material is used in heavy metal adsorption, a low concentration of anionic and cationic heavy metal ions can be completely removed at the same time; and when the material is used in $CO_2$ capturing, a $CO_2$ adsorption capacity is more than 6 mmol/g.

19. Use of the biomass intelligent fiber-based amphoteric multifunctional adsorptive material according to claim 1, in marsh gas purification; and the material used in marsh gas purification is to adsorb $CO_2$ gas in marsh gas.

20. Use of the biomass intelligent fiber-based amphoteric multifunctional adsorptive material prepared by the preparation method according to claim 4 in marsh gas purification; and the material used in marsh gas purification is to adsorb $CO_2$ gas in marsh gas.

\* \* \* \* \*